(12) United States Patent
Summers et al.

(10) Patent No.: US 10,615,547 B2
(45) Date of Patent: Apr. 7, 2020

(54) ELECTRICAL DEVICE WITH SHUNT, AND RECEPTACLE

(71) Applicant: Raytheon Company, Waltham, MA (US)

(72) Inventors: Matthew H. Summers, Marana, AZ (US); Jeremy C. Danforth, Tucson, AZ (US); David G. Garrett, Tucson, AZ (US); Dmitry V. Knyazev, Tucson, AZ (US); Stephen M. Bagg, Boston, MA (US); Gaines S. Gibson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 732 days.

(21) Appl. No.: 15/259,875

(22) Filed: Sep. 8, 2016

(65) Prior Publication Data
US 2018/0069352 A1 Mar. 8, 2018

(51) Int. Cl.
*H01R 13/70* (2006.01)
*H01R 13/703* (2006.01)
(Continued)

(52) U.S. Cl.
CPC .......... *H01R 13/7032* (2013.01); *F02K 9/38* (2013.01); *F42B 3/182* (2013.01);
(Continued)

(58) Field of Classification Search
CPC ............ H01R 13/7032; H01R 13/7301; H01R 42/36; F02K 9/38
(Continued)

(56) References Cited

U.S. PATENT DOCUMENTS 3,182,277 A * 5/1965 Ashby ................ H01R 13/6592
102/202.1
3,398,916 A 8/1968 van Vyve
(Continued)

FOREIGN PATENT DOCUMENTS

| EP | 0 632 546 A2 | 1/1995 |
| FR | 2 492 966 A1 | 4/1982 |
| WO | 2013/087482 A1 | 6/2013 |

OTHER PUBLICATIONS

International Search Report and Written Opinion of the International Searching Authority for corresponding International Application No. PCT/US2017/023179 dated Jun. 27, 2017.

*Primary Examiner* — Alexander Gilman
(74) *Attorney, Agent, or Firm* — Renner, Otto, Boiselle & Sklar, LLP

(57) ABSTRACT

An electrical device has device electrical contacts that are initially shunted together, to prevent accidental triggering or damage to the device, such as by electrostatic forces. The device is configured to be inserted into a receptacle, with parts of the receptacle disengaging the shunt and making electrical connection within the receptacle, such as with a shunt cutter. The receptacle may also include a pair of receptacle electrical contacts the electrically connect to the device electrical contacts. The configuration, where the shunt is only cut as part of the installation process, enables safer handling of initially-shunted devices, and can also facilitate making blind electrical connections. Making blind connection directly with parts of the receptacle also avoids the need to thread wires through the electrical receptacle and make electrical connections in another way.

20 Claims, 3 Drawing Sheets

(51) Int. Cl.
  *F42B 3/182* (2006.01)
  *F02K 9/38* (2006.01)
  *H01R 43/26* (2006.01)
  *H01R 13/66* (2006.01)
  *F42B 10/66* (2006.01)

(52) U.S. Cl.
  CPC ......... *H01R 13/7031* (2013.01); *H01R 43/26* (2013.01); *F05D 2260/99* (2013.01); *F42B 10/661* (2013.01); *H01R 13/6658* (2013.01)

(58) Field of Classification Search
  USPC ........................................................ 439/188
  See application file for complete search history.

(56) References Cited

U.S. PATENT DOCUMENTS

| | | | |
|---|---|---|---|
| 3,500,747 A | 3/1970 | Parker | |
| 3,665,590 A | 5/1972 | Percival | |
| 3,860,199 A | 1/1975 | Dunne | |
| 3,977,629 A | 8/1976 | Tubeuf | |
| 4,009,661 A | 3/1977 | Imrie | |
| 4,408,735 A | 10/1983 | Metz | |
| 4,463,921 A | 8/1984 | Metz | |
| 4,482,107 A | 11/1984 | Metz | |
| 4,784,619 A * | 11/1988 | Blanchet | H01R 31/02 439/724 |
| 4,954,093 A * | 9/1990 | Nadin | H01R 31/08 439/188 |
| 5,027,596 A * | 7/1991 | Steenborg | F02K 9/68 392/481 |
| 5,071,362 A * | 12/1991 | Martens | H01R 13/7032 200/51.1 |
| 5,195,902 A * | 3/1993 | Bengal | H01R 9/032 439/188 |
| 5,275,575 A * | 1/1994 | Cahaly | H01R 13/7032 200/51.1 |
| 5,325,785 A * | 7/1994 | Gardner | F42C 19/0834 102/430 |
| 5,431,104 A | 7/1995 | Barker | |
| 5,435,754 A * | 7/1995 | Hotea | H01R 13/6616 439/620.21 |
| 5,516,030 A | 5/1996 | Denton | |
| 5,647,558 A | 7/1997 | Linick | |
| 5,695,152 A | 12/1997 | Levy | |
| 5,836,540 A | 11/1998 | Romer et al. | |
| 6,004,150 A * | 12/1999 | Chapman | H01R 29/00 439/189 |
| 6,029,883 A * | 2/2000 | Hechinger | B65D 27/04 229/71 |
| 6,036,534 A * | 3/2000 | Hoyt | H01R 31/08 439/483 |
| 6,138,945 A | 10/2000 | Biggers et al. | |
| 6,153,505 A * | 11/2000 | Bolde | B23K 3/0638 228/180.22 |
| 6,178,741 B1 | 1/2001 | Nelson et al. | |
| 6,272,742 B1 * | 8/2001 | Armezzani | H05K 1/112 29/825 |
| 6,347,763 B1 | 2/2002 | Harkins et al. | |
| 6,367,735 B1 | 4/2002 | Folsom et al. | |
| 6,584,907 B2 | 7/2003 | Boucher et al. | |
| 6,787,443 B1 * | 9/2004 | Boggs | H05K 1/116 29/852 |
| 6,889,610 B2 | 5/2005 | Boucher et al. | |
| 6,889,935 B2 | 5/2005 | O'Dwyer | |
| 7,004,423 B2 | 2/2006 | Folsom et al. | |
| 7,112,888 B2 * | 9/2006 | Kuramoto | H01L 21/4853 257/780 |
| 7,253,556 B1 * | 8/2007 | Gibboney | H01J 5/56 313/318.01 |
| 7,416,154 B2 | 8/2008 | Bittle et al. | |
| 7,453,194 B1 * | 11/2008 | Gibboney | H01K 1/46 313/318.09 |
| 7,494,089 B2 | 2/2009 | Williams et al. | |
| 7,497,710 B2 * | 3/2009 | Spink, Jr. | H01R 13/7032 439/188 |
| 7,581,870 B2 * | 9/2009 | Massabki | F21V 19/0005 362/652 |
| 7,631,600 B2 | 12/2009 | O'Dwyer | |
| 7,814,696 B2 | 10/2010 | Rapp et al. | |
| 7,980,871 B2 * | 7/2011 | Li | F21V 19/0005 439/188 |
| 7,989,345 B2 * | 8/2011 | Akram | H01L 21/76898 438/639 |
| 8,084,725 B1 | 12/2011 | Dryer | |
| 8,757,065 B2 * | 6/2014 | Fjerstad | F42B 15/36 102/377 |
| 9,162,933 B1 | 10/2015 | Hordos | C06C 9/00 |
| 9,248,802 B2 * | 2/2016 | Gordon | B60R 21/017 |
| 2011/0009206 A1 * | 1/2011 | Soracco | A63B 53/02 473/307 |
| 2011/0275245 A1 * | 11/2011 | Annecke | H01R 13/701 439/620.21 |
| 2012/0117941 A1 * | 5/2012 | Olden | B64G 1/26 60/255 |
| 2012/0135620 A1 * | 5/2012 | Park | H01R 13/506 439/188 |
| 2014/0197153 A1 | 7/2014 | Aguilar et al. | |
| 2016/0057882 A1 | 2/2016 | Wuerstlein et al. | |
| 2018/0069352 A1 * | 3/2018 | Summers | F02K 9/38 |

\* cited by examiner

ELECTRICAL DEVICE WITH SHUNT, AND RECEPTACLE

FIELD OF THE INVENTION

The invention is in the field of electrical devices, in particular to making electrical connections with electrical devices having shunts.

DESCRIPTION OF THE RELATED ART

Shunted electrical devices, such as thrusters for a divert attitude control systems, are installed with blind connections. Such devices are generally installed by removing the shunt, and then installing the device, with the electrical connections being hand wired.

SUMMARY OF THE INVENTION

A shunted electrical device is installed by inserting it into a receptacle that includes a cutter to deactivate the shunt.

According to an aspect of the invention, an installation includes: an electrical device; and a receptacle that receives and electrically connects with the electrical device. The electrical device includes: a pair of device electrical contacts; and a shunt electrically connecting the pair of device electrical contacts. The receptacle includes: a pair of receptacle electrical contacts; and a cutter. When the electrical device is inserted into the receptacle, the cutter severs the shunt, breaking the electrical connection between the device electrical contacts, and allowing electrical connection between the device electrical contacts and the receptacle electrical contacts.

According to an embodiment of any paragraph(s) of this summary, the cutter is a protrusion from the receptacle, between the receptacle electrical contacts.

According to an embodiment of any paragraph(s) of this summary, the cutter protrudes further than the receptacle electrical contacts from a surface of the receptacle.

According to an embodiment of any paragraph(s) of this summary, the electrical device is an energetic device that includes an energetic material that is electrically actuated by applying electricity to the device electrical contacts.

According to an embodiment of any paragraph(s) of this summary, the energetic materials includes a booster and a propellant.

According to an embodiment of any paragraph(s) of this summary, the device electrical contacts are operatively coupled to the booster to activate the booster.

According to an embodiment of any paragraph(s) of this summary, the booster is operatively coupled to the propellant to activate the propellant.

According to an embodiment of any paragraph(s) of this summary, the energetic device is a thruster.

According to an embodiment of any paragraph(s) of this summary, the receptacle electrical contacts are on a circuit card assembly.

According to an embodiment of any paragraph(s) of this summary, the installation includes solder balls on some or all of the electrical contacts.

According to an embodiment of any paragraph(s) of this summary, the receptacle includes channels for directing hot air to the solder balls, to solder the device electrical contacts to respective of the receptacle electrical contacts.

According to an embodiment of any paragraph(s) of this summary, the device electrical contacts and the shunt are parts of a connector of the electrical device that protrudes from a main body of the electrical device, and enters into a recess at a bottom of the receptacle.

According to an embodiment of any paragraph(s) of this summary, the shunt covers a recess between the device electrical contacts; and According to an embodiment of any paragraph(s) of this summary, the cutter passes through the shunt and into the recess between the device electrical contacts, when the electrical device is engaged with the receptacle.

According to an embodiment of any paragraph(s) of this summary, the electrical device makes a blind connection with the receptacle.

According to an embodiment of any paragraph(s) of this summary, the shunt has a thickness of 0.254-0.762 mm (0.010-0.030 inches).

According to an embodiment of any paragraph(s) of this summary, the receptacle electrical contacts are part of a circuit card assembly.

According to an embodiment of any paragraph(s) of this summary, the cutter is also part of the circuit card assembly.

According to an embodiment of any paragraph(s) of this summary, the electrical device is a thruster; and According to an embodiment of any paragraph(s) of this summary, the thruster is part of a divert attitude control system of a flying vehicle.

According to an embodiment of any paragraph(s) of this summary, the installation is in combination with other parts of the flying vehicle.

According to an embodiment of any paragraph(s) of this summary, the flying vehicle is an unpowered projectile.

According to another aspect of the invention, a method of making a blind electrical connection includes the steps of: inserting an electrical device into a receptacle, wherein the inserting includes a cutter of the receptacle breaking a shunt of the electrical device that electrically couples together device electrical contacts of the electrical device; and electrically coupling the device electrical contacts to respective receptacle electrical contacts of the receptacle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

An electrical device has device electrical contacts that are initially shunted together, to prevent accidental triggering or damage to the device, such as by electrostatic forces. The device is configured to be inserted into a receptacle, with parts of the receptacle disengaging the shunt and making electrical connection within the receptacle. The receptacle may have a mechanism for disengaging the shunt, such as a shunt cutter that protrudes from an inside surface of the receptacle, with the cutter cutting or otherwise disengaging the shunt as the electrical device is inserted into the receptacle. The receptacle may also include a pair of receptacle electrical contacts the electrically connect to the device electrical contacts. The configuration, where the shunt is only cut as part of the installation process, enables safer handling of initially-shunted devices, and can also facilitate making blind electrical connections, since some or all of the electrical contacts may have solder balls or other soft metal on them for making a blind electrical connection when the electrical device is inserted into the receptacle (with heat being perhaps applied). Making blind connection directly with parts of the receptacle also avoids the need to thread wires through the electrical receptacle and make electrical connections in another way. This can help reduce installation time and avoid errors in making electrical connections. The blind shunt disengagement and electrical connection may be used in a variety of circumstances, including in thrusts for flight vehicles, such as multi-thruster divert attitude control systems used for changing attitude and/or steering and/or translating the flight vehicle.

Figure 1:
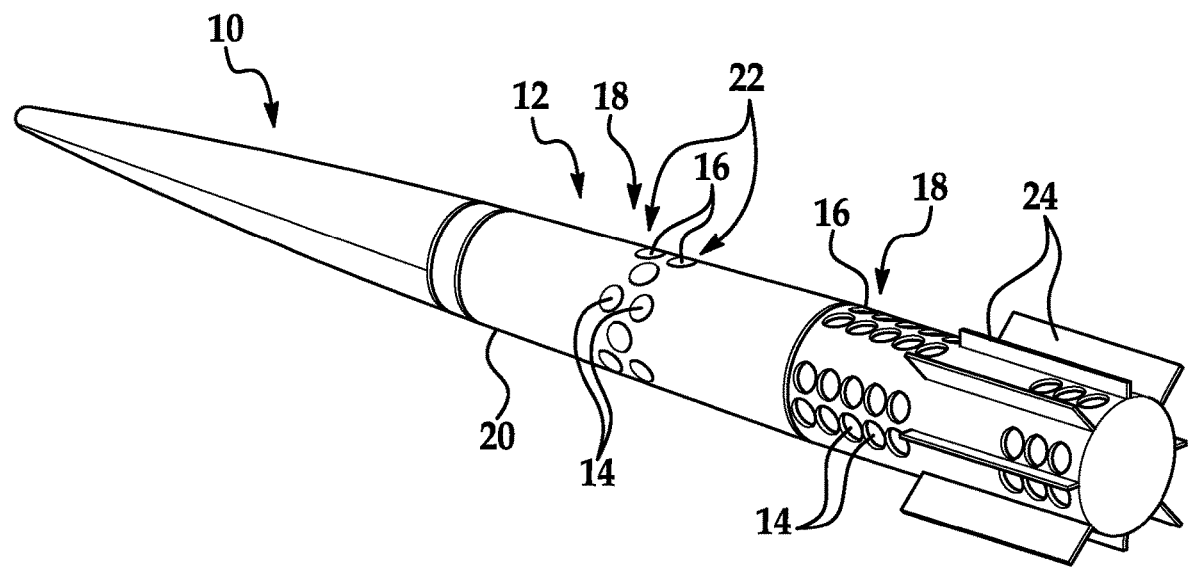
FIG. 1 is an oblique view of a projectile that includes electrical devices (thrusters), in accordance with an embodiment of the invention.
Figure 2:
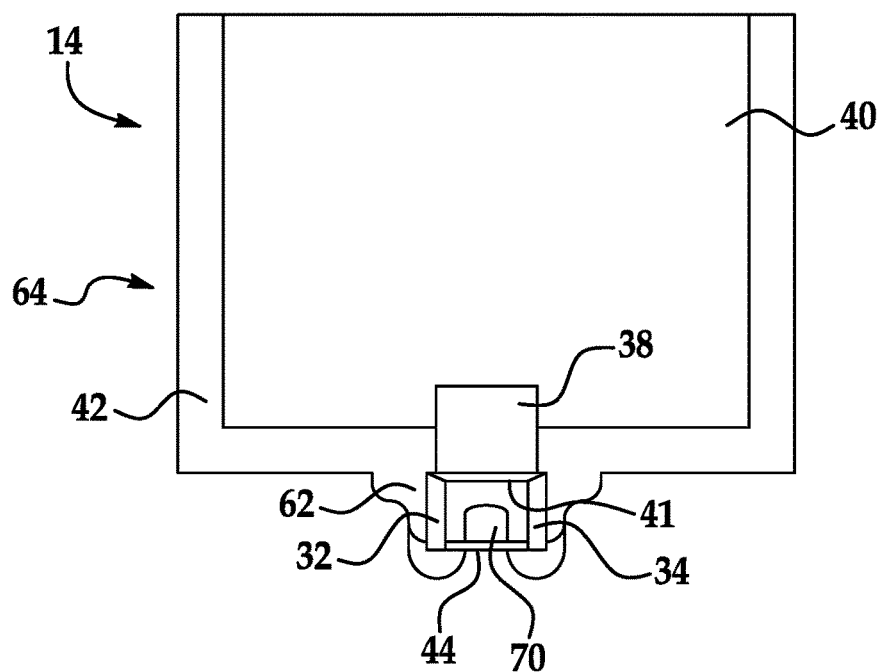
FIG. 2 is a side sectional view of a thruster of the projectile of FIG. 1.
Figure 3:
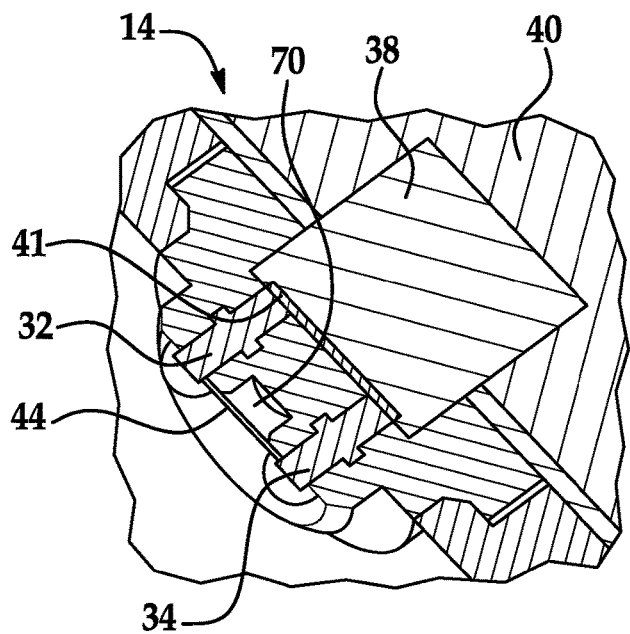
FIG. 3 is a detailed view of part of the thruster of FIG. 2.
Figure 4:
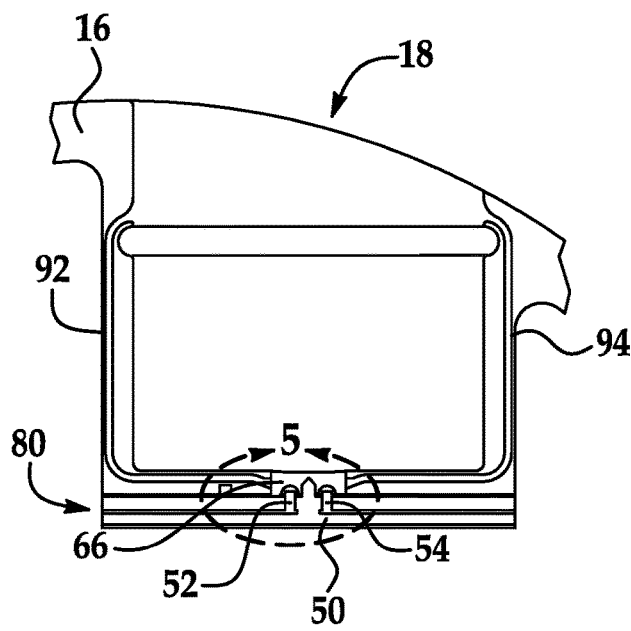
FIG. 4 is a side view of a receptacle for receiving the thruster of FIG. 2.
Figure 5:
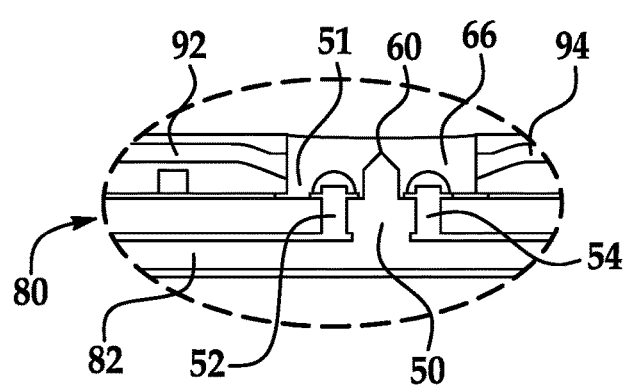
FIG. 5 is a detailed view of part of the receptacle of FIG. 4.

FIG. 1 shows an example of a flight vehicle, a projectile 10 that is launched toward a target, such as by being launched from a rail gun. The projectile 10 includes a controls system 12, that includes of a series of thrusters 14 in receptacles 16 that define recesses or spaces 18 at various locations along and around a fuselage 20 of the projectile 10. The combination of the thrusters 14 inserted into the recesses 18 defined by the receptacles 16 produces a series of thruster installations 22 around the fuselage 20. The thrusters 14 are connected to a central control system (not shown) of the projectile 10, which is used to trigger the firing of the thrusters 14 as desired. The thrusters 14 may be fired individually or in groups, simultaneously or at different times, in order to maneuver the projectile 10 during flight. The maneuvers may involve changes in attitude or translations, or some combination of the two, in order to steer or direct the projectile on an intended course or to an intended destination.

The projectile 10 may have other components, such as fins 24 as well as other components that are not shown (such as a payload, a sensor system, a guidance system, and a communication system), that may be similar to those used in prior projectiles. Details regarding such components are not included herein.

The projectile 10 may be a projectile launched from a railgun launcher. Alternatively the projectile may be other sorts of projectiles. More broadly, such thrusters and systems may be usable in a wide variety of flight vehicles, either powered or unpowered.

The thrusters 14 may have various operating times and/or amounts of thrust. For example, some of the thrusters 4 may have a 1-2 millisecond duration.

Turning now to FIGS. 2-5, some details of the thruster 14 and the receptacle 16 will now be discussed. The thruster 14 is produced separately as a self-contained unit, that is to be placed in the receptacle 16, to form the combination 22 (FIG. 1), for use as part of the guidance system of the projectile 10. The thruster 14 has a pair of device electrical contacts 32 and 34 that are used for making electrical connection with other contacts in the receptacle 16. The electrical connection is a blind connection, in that the connection is made in a location within the receptacle 16, externally inaccessible to the installer. In the illustrated embodiment the connection is made at the bottom end of the thruster 14, where the thruster 14 engages the bottom of the receptacle 16.

The thruster 14 includes a booster 38 that is operatively coupled to the device electrical contacts 32 and 34, and a propellant 40. Power is applied to the device contacts 32 and 34 to provide power to a bridge wire 41, to initiate combustion (or detonation) in the booster 38, which in turn initiates combustion in the propellant 40. A casing 42 of the thruster 14 encloses and protects the propellant 40 and other components.

A shunt 44 initially electrically couples the device electrical contacts 32 and 34, to prevent initiation of the booster 38 (and the thruster 14 as a whole) prior to installation of the thruster 14 in the receptacle 16. It will be appreciated that premature detonation (or other initiation) of the thruster 14 could cause serious harm to personnel, as well as other problems, and that safety concerns place a premium on avoiding premature detonation of the thruster 14. Some devices, such as the thruster 14, are sensitive to electrostatic charges, such that the shunt 44 is used during handling and transportation, before installation of the thruster 14 in the receptacle 16. While in the case of the thruster 14 the danger of electrostatic charges is primarily a safety concern, for other sorts of devices there may be other disadvantages to electrostatic charges or other possible effects of having the device unshunted, such as damage to the device itself.

The shunt 44 electrically couples the device contacts 32 and 34 together, such that electrostatic forces cannot trigger the booster 38. By electrically coupling the device contacts 32 and 34 together, any electrostatic force on one of the contacts 32 and 34 is substantially immediately communicated to the other of the contacts 32 and 34, preventing a potential difference between the contacts 32 and 34 that could result in current flowing through the bridge wire 41, and possibly triggering the booster 38.

It is advantageous for the shunt 44 to remain place as long as possible until the thruster 14 is fully installed in the receptacle 16. To that end, and with reference to FIGS. 4 and 5, the receptacle 16 has a cutter 50 on a bottom surface 51. The cutter 50 is configured to sever the shunt 44 or otherwise break the connection of the shunt 44 between the device electrical contacts 32 and 34, in the process illustrated in FIGS. 6 and 7. The cutter 50 may be located between receptacle electrical contacts 52 and 54 that are electrically connected to the respective device 32 and 34, when the thruster 14 is fully installed in the receptacle 16. The cutter 50 may be a protrusion, protruding out from the bottom surface 51 of the receptacle 16. The cutter 50 may be located between the receptacle electrical contacts 52 and 54, and/or may protrude farther from the bottom surface 51 than do the receptacle electrical contacts 52 and 54.

The shunt 44 may be made of any of a variety of suitable materials, such as a suitable electrically-conductive metal, for example copper or tin. The shunt 44 may have a suitable thickness, such as a thickness of 0.254-0.762 mm (0.010-0.030 inches), or may be pre-perforated to allow it be severed by the cutter 50.

The cutter 50 has a sharp point or edge 60 that is used to sever the shunt 44. The cutter 50 may be made of any non-electrically-conductive strong material, such as plastic, fiberglass, or glass.

The shunt 44 and the device electrical contacts 32 and 34 may be in a connector 62 of the thruster 14 that protrudes out from the bottom surface of a main body 64 of the thruster 14. When the thruster 14 is inserted into the receptacle 16 the connector 62 enters a recess 66 at the bottom of the receptacle 16. In the receptacle recess 66 the shunt 44 is engaged by the cutter 50 and the contacts 32 and 34 engage the contacts 52 and 54.

Figure 6:
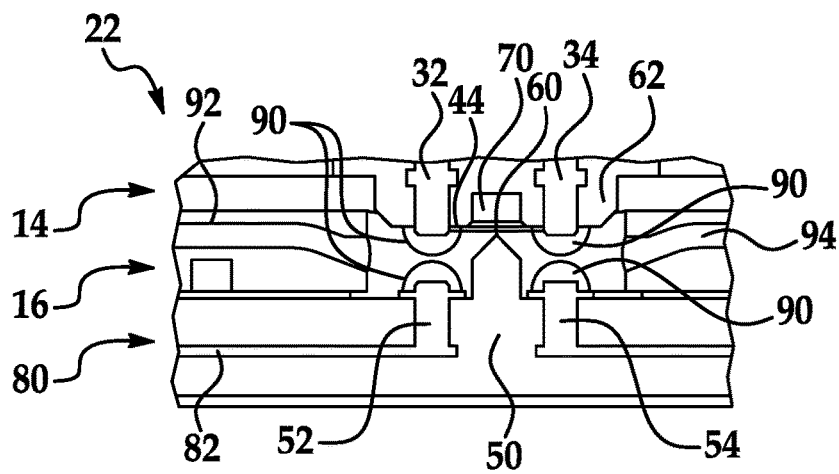
FIG. 6 shows a first step in the installation of the thruster of FIG. 2 into the receptacle of FIG. 4.
Figure 7:
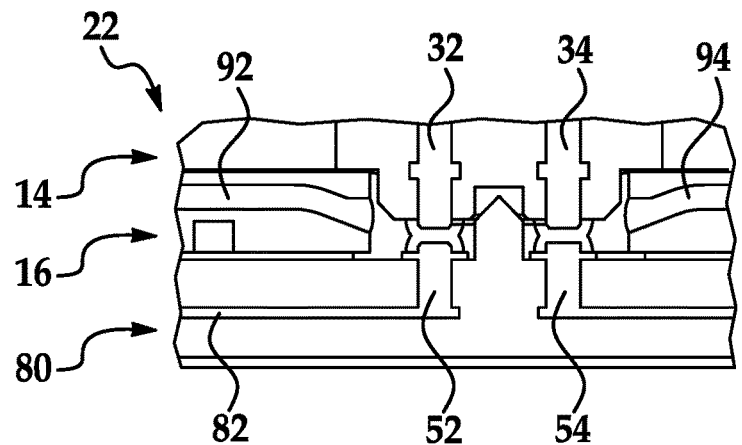
FIG. 7 is shows a second step in the installation process.

The connector 62 may have a connector recess 70 that is at least partially covered over by the shunt 44. The cutter 50 may pierce or sever the shunt 44 and enter into the connector recess 70 when the thruster 14 is inserted into the receptacle 16, as shown in FIGS. 6 and 7.

The cutter 50 and the receptacle electrical contacts 52 and 54 may be parts of a circuit card assembly (CCA) 80. Traces 82 on the CCA 80 may be hooked up to a controller that sends signals controlling the firing of the thruster 14. A seal 86 may be used to seal the connection between the CCA 80 and the other parts of the receptacle 16.

The device electrical contacts 32 and 34 and/or the receptacle electrical contacts 52 and 54 may have solder balls 90 on their ends, to aid in making electrical connection between the two pairs of electrical contacts. The solder balls 90 may be made of traditional tin-based solder alloys. The receptacle 16 may have channels 92 and 94 that may be used to direct hot air the vicinity of the solder balls 90 after insertion of the thruster 14 into the receptacle 16, in order to melt the solder of the solder balls 90, which then re-solidifies to make a solid electrical connection between the contacts 32 and 52, and the contacts 34 and 54. The thruster 14 may have a mechanical key feature to ensure that it is properly inserted into the receptacle 16. The channels 92 and 94 may be formed in additive manufacturing process for making the receptacle 16, either separately from or as part of a process for making a larger part of the fuselage 20 (FIG. 1). Hot air (or another hot gas) for the soldering process may be provided for a suitable external source.

Additive manufacturing or three-dimensional printing methods that may be used for producing the receptacle 16 (including the channels 92 and 94 include processes, other layerwise deposition processes, and methods, such as, but not limited to: Selective Laser Sintering (SLS), Stereolithography (SLA), micro-stereolithography, Laminated Object Manufacturing (LOM), Fused Deposition Modeling (FDM), MultiJet Modeling (MJM), aerosol jet, direct-write, inkjet fabrication, and micro-dispense. Areas of overlap can exist between many of these methods, which can be chosen as needed based on the materials, tolerances, size, quantity, accuracy, cost structure, critical dimensions, and other parameters defined by the requirements of the object or objects to be made.

Many alternatives are possible for materials, configurations, and manufacturing methods. For example, soft metal connections and or mechanical engagements may be usable in place of the solder balls 90. As another alternative, the channels 92 and 94 may have a different configuration than that shown, and/or may be made by a different process than an additive manufacturing process.

It will be appreciated that the thruster 14 is part of a larger group of energetic devices that are actuated to set off a reaction. For example other sorts of energetic devices include pressurized-gas-producing devices such as air bag inflators, and devices that involve detonation of an explosive or initiation of a combustion reaction, such as squibs.

Figure 8:
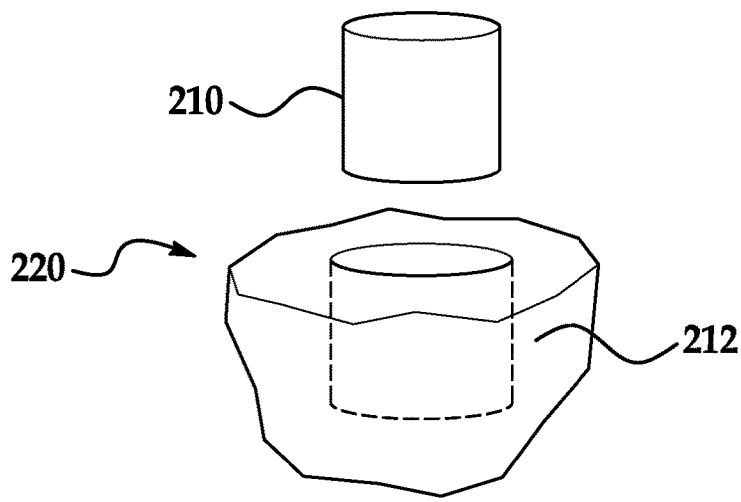
FIG. 8 schematically shows an electrical installation with an electrical device engaging a receptacle, in accordance with another embodiment of the invention.

With reference now in addition to FIG. 8, blind connection is made between an electrical device 210 and a receptacle 212 that receives the device 210, the two together making an installation 220. The thruster 14 (FIG. 2) described above is just one example of the electrical device 210, a device that has contacts shunted prior to installation, and for which electrical connection is made and the shunt is severed or otherwise disabled, as described above for the installation 22 (FIG. 1). Details of the connection for the installation 220 may be similar to those described above for the installation 22.

It may also be advantageous to use installations such as described above for integrated circuits and circuit card assemblies, for the purpose of avoiding unintended power application or dissipation to the integrated circuits and circuit card assemblies. One such example of why this would be advantageous would be to reduce or mitigate the risk of electro-static discharge (ESD) to sensitive hardware, components, or circuits within the integrated circuits and circuit card assemblies.

The various combinations described above provide safety advantages by keeping a shunt in place until it is automatically removed during the installation process. The safety may involve protecting the device to be installed and/or protecting personnel and/or other equipment. The combination also provides for easier installation, for example avoiding hand wiring of connections. Further, there is a less of an opportunity for mis-wiring connections, for example avoiding undesired firing of the wrong thrusters.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. An installation, comprising:
an electrical device; and
a receptacle that receives and electrically connects with the electrical device;
wherein the electrical device includes:
a pair of device electrical contacts; and
a shunt electrically connecting the pair of device electrical contacts;
wherein the receptacle includes:
a pair of receptacle electrical contacts; and
a cutter; and wherein, when the electrical device is inserted into the receptacle, the cutter severs the shunt, breaking the electrical connection between the device electrical contacts, and allowing electrical connection between the device electrical contacts and the receptacle electrical contacts.

2. The installation of claim 1, wherein the cutter is a protrusion from the receptacle, between the receptacle electrical contacts.

3. The installation of claim 2, wherein the cutter protrudes further than the receptacle electrical contacts from a surface of the receptacle.

4. The installation of any of claim 1, wherein the electrical device is an energetic device that includes an energetic material that is electrically actuated by applying electricity to the device electrical contacts.

5. The installation of claim 4,
wherein the energetic materials includes a booster and a propellant;
wherein the device electrical contacts are operatively coupled to the booster to activate the booster; and
wherein the booster is operatively coupled to the propellant to activate the propellant.

6. The installation of claim 4, wherein the energetic device is a thruster.

7. The installation of any of claim 1, wherein the receptacle electrical contacts are on a circuit card assembly.

8. The installation of claim 1, further comprising solder balls on some or all of the electrical contacts.

9. The installation of claim 8, wherein the receptacle includes channels for directing hot air to the solder balls, to solder the device electrical contacts to respective of the receptacle electrical contacts.

10. The installation of claim 1, wherein the device electrical contacts and the shunt are parts of a connector of the electrical device that protrudes from a main body of the electrical device, and enters into a recess at a bottom of the receptacle.

11. The installation of claim 1,
wherein the shunt covers a recess between the device electrical contacts; and
wherein the cutter passes through the shunt and into the recess between the device electrical contacts, when the electrical device is engaged with the receptacle.

12. The installation of claim 1, wherein the electrical device makes a blind connection with the receptacle.

13. The installation of claim 1, wherein the shunt has a thickness of 0.254-0.762 mm (0.010-0.030 inches).

14. The installation of claim 1, wherein the receptacle electrical contacts are part of a circuit card assembly.

15. The installation of claim 14, wherein the cutter is also part of the circuit card assembly.

16. The installation of claim 1,
wherein the electrical device is a thruster; and
wherein the thruster is part of a divert attitude control system of a flying vehicle.

17. The installation of claim 16, in combination with other parts of the flying vehicle.

18. The combination of claim 17, wherein the flying vehicle is an unpowered projectile.

19. The combination of claim 1, wherein the cutter has a sharp point or edge that is used to sever the shunt by cutting the shunt.

20. A method of making a blind electrical connection, the method comprising:
inserting an electrical device into a receptacle, wherein the inserting includes a cutter of the receptacle breaking a shunt of the electrical device that electrically couples together device electrical contacts of the electrical device; and
electrically coupling the device electrical contacts to respective receptacle electrical contacts of the receptacle.

* * * * *